(12) United States Patent
Caron

(10) Patent No.: US 8,800,349 B2
(45) Date of Patent: Aug. 12, 2014

(54) CALIBRATION OF GYROSCOPIC SYSTEMS WITH VIBRATORY GYROSCOPES

(75) Inventor: Jean-Michel Caron, Paris (FR)

(73) Assignee: Sagem Defense Securite, Paris (FR)

( * ) Notice: Subject to any disclaimer, the term of this patent is extended or adjusted under 35 U.S.C. 154(b) by 275 days.

(21) Appl. No.: 13/125,442

(22) PCT Filed: Nov. 27, 2009

(86) PCT No.: PCT/EP2009/066001
§ 371 (c)(1),
(2), (4) Date: Jul. 11, 2011

(87) PCT Pub. No.: WO2010/060994
PCT Pub. Date: Jun. 3, 2010

(65) Prior Publication Data
US 2011/0259078 A1    Oct. 27, 2011

(30) Foreign Application Priority Data

Nov. 28, 2008 (FR) ...................................... 08 58145

(51) Int. Cl.
*G12B 13/00* (2006.01)

(52) U.S. Cl.
USPC .......................................................... 73/1.77

(58) Field of Classification Search
None
See application file for complete search history.

(56) References Cited

U.S. PATENT DOCUMENTS

| | | | |
|---|---|---|---|
| 5,712,427 A | 1/1998 | Matthews | |
| 6,598,455 B1 * | 7/2003 | Gutierrez et al. | 73/1.77 |
| 7,644,604 B2 * | 1/2010 | Hotelling et al. | 73/1.77 |
| 2009/0158846 A1 * | 6/2009 | Lignon et al. | 73/504.12 |

FOREIGN PATENT DOCUMENTS

| | | |
|---|---|---|
| EP | 1970669 A2 | 9/2008 |
| FR | 2755227 | 10/1996 |
| GB | 2319085 A | 10/1997 |
| WO | WO 2009/053562 A2 | 4/2009 |

OTHER PUBLICATIONS

Andrei M. Shkel, "Type I and Type II Micromachined Vibratory Gyroscopes", pp. 586-593, IEEE/ION Institute of Electrical and Electronics Engineers/ Institute of Navigation) Plans 2006, San Diego, CA, USA.

* cited by examiner

*Primary Examiner* — Robert R Raevis
(74) *Attorney, Agent, or Firm* — Miller, Matthias & Hull LLP

(57) ABSTRACT

In a gyroscopic system comprising at least four vibratory gyroscopes, a first measurement is provided by said vibratory gyroscope to be calibrated, and a second measurement is provided by a combination of the measurements from the other vibratory gyroscopes of the system. At the level of the vibratory gyroscope to be calibrated, an initial command is applied in order to command a change in position from a first vibration position ($\theta_1$) to a second vibration position ($\theta_2$). A calibrated scale factor value of the vibratory gyroscope to be calibrated is then determined on the basis of a calculated value in relation to the change in position, based on the period of time during which the initial command is applied, the initial command, an angular difference between the first and second vibration positions measured according to the first measurement and an angular difference between the first and second vibration positions measured according to the second measurement.

10 Claims, 1 Drawing Sheet

CALIBRATION OF GYROSCOPIC SYSTEMS WITH VIBRATORY GYROSCOPES

CROSS-REFERENCE TO RELATED APPLICATIONS

This application is a U.S. national stage filing under 35 USC §371 of International Patent Application No. PCT/EP2009/066001 filed on Nov. 27, 2009, which claims priority under the Paris Convention to the French Patent Application No. 08 58145, filed on Nov. 28, 2008.

FIELD OF THE DISCLOSURE

The present invention relates to gyroscopic systems, such as in particular inertial navigation units, and more particularly to gyroscopic systems that are based on the use of vibratory gyroscopes.

BACKGROUND OF THE DISCLOSURE

An inertial unit is a precision navigation device that comprises in particular gyroscopes in order to be able to provide navigation information for carriers such as ships, aircraft, missiles or all types of space vehicle.

The level of precision required for the measurements provided by the gyroscopes used in these inertial units depends on the type of inertial unit considered. Certain units, such as strapdown inertial navigation systems, i.e. navigation units in which the gyroscopes are strapped to the structure of the carrier, require a level of precision of the measurement provided by the gyroscopes greater than that which is required in other types of unit.

In order for a strapdown inertial navigation system to be capable of providing precise and reliable measurements, laser gyroscopes are conventionally used, as they have a high quality scale factor. However, this type of gyroscope is expensive.

It therefore appears advantageous to be able to replace them with less expensive gyroscopes, such as HRG-type vibratory gyroscopes (for 'Hemispherical Resonator Gyroscope').

An axisymmetric vibratory gyroscope (these Type I gyroscopes correspond to the axisymmetric gyroscopes of the Coriolis Vibratory Gyroscope (CVG) type, such as for example of the Hemispherical Resonator Gyroscope (HRG) type, as described in the document 'Type I and Type II micromachined vibratory gyroscopes' by Andrei M. Shkel, pages 586-593, IEEE/ION (Institute of Electrical and Electronics Engineers/Institute Of Navigation' PLANS 2006, San Diego, Calif., USA)) can be used either in whole angle mode in which its vibration position is free, or in a rate mode in which its vibration position is fixed and maintained by application of an electrical command, the measurement values provided being deduced from the electrical command applied, as well as from a value of the scale factor associated with the vibratory gyroscope(s) used.

By the term 'scale factor' is meant here the factor between the rotation of the vibration wave of the vibratory gyroscope and the rotation of the support of the vibratory gyroscope, i.e. the ratio relating to the drive of the rotation of the vibration wave of the gyroscope by the mechanical rotation of the support of the gyroscope. In theory, this scale factor for a given vibratory gyroscope is a constant value that can correspond to a nominal value associated with the gyroscope considered.

Moreover, such a gyroscope used in whole angle mode has a bias error the value of which depends on the vibration position with respect to the case.

The measurement values provided by such a vibratory gyroscope can therefore be impaired by certain errors that relate to the changes in the bias, since the bias value depends on the vibration position and therefore on the changes in the attitude of the carrier.

It should moreover be noted that a use of such a vibratory gyroscope in whole angle mode makes it possible to provide measurement values with errors relating to the scale factor that are advantageously small. On the other hand, in this mode, the measurement values, which are angle values, provided by the vibratory gyroscope, are impaired by a noise known as 'angular noise'.

In order to avoid this variable bias as well as this angular noise, the vibratory gyroscope can be used in a rate mode.

However, such an operating mode can significantly degrade the level of quality of the measurement as in this case errors relating to the scale factor appear. Therefore, in such an operating mode, these vibratory gyroscopes cannot satisfy the quality criteria required in particular for a strapdown inertial system.

SUMMARY OF THE DISCLOSURE

The present invention will improve the situation.

An objective of the present invention is to use HRG type vibratory gyroscopes in inertial navigation systems that require a high level of precision in rate mode. In such an operating mode, the measurement values provided are not impaired by the variable bias and angular noise. Provision is then advantageously made to correct the error relating to the scale factor that affects the measurement values of a gyroscope operating in this mode.

A first aspect of the present invention proposes a method of calibrating a gyroscope to be calibrated in a gyroscopic system comprising at least four vibratory gyroscopes capable of changing vibration position among a plurality of vibration positions;
a first measurement being provided by said vibratory gyroscope to be calibrated, and a second measurement being provided by a combination of the respective measurements from the other vibratory gyroscopes of the system, said first and second measurements being carried out along a same measurement axis;
said calibration method comprising the following steps at the level of the vibratory gyroscope to be calibrated:
  /1/ applying to the gyroscope to be calibrated, over a period of time, an initial command for a change in vibration position from a first vibration position to a second vibration position; and
  /2/ determining a calibrated scale factor value of the vibratory gyroscope to be calibrated, on the basis of a value calculated in relation to step /1/, based on the period of time during which the initial command is applied, the initial command, an angular difference between the first and second vibration position measured according to the first measurement and an angular difference, measured over the period of change in vibration position of the gyroscope to be calibrated, according to the second measurement.

Provision can in particular be made here for the command for a change in vibration position to be determined on the basis of the nominal scale factor theoretically known for this vibratory gyroscope undergoing calibration.

Such a gyroscopic system therefore comprises at least four vibratory gyroscopes that are arranged so that any one of these vibratory gyroscopes, as the first means of measurement, can provide a measurement along the same measurement axis as a combination of the other vibratory gyroscopes considered as the second means of measurement.

This method of calibration can advantageously be applied for the calibration of the scale factor of a gyroscope in rate mode, the rate mode making it possible for the measurement values not to be impaired by the variable bias and angular noise.

Due to these arrangements, it is possible to determine a scale factor value of the gyroscope. We have here, on the one hand, an angular difference $\theta_2 - \theta_1$, or angular displacement value, between the first vibration position, referenced $\theta_1$, and the second vibration position, referenced $\theta_2$, as measured by the vibratory gyroscope according to the first measurement, and on the other hand, the position change command applied and its application time. However, when the gyroscopic system considered is on a mobile carrier, the angular displacement value measured by the vibratory gyroscope undergoing calibration indicates the sum of the angular displacement value commanded according to the application of the command and the angular displacement value due to the movement of the carrier.

Here, advantageously, provision is also made to take the second measurement into account in order to correct the first measurement for any movement of the carrier of the gyroscopic system. Thus, the second measurement is used as a reference measurement in order to determine, based on the first measurement from the gyroscope, the angular displacement value that is measured by the vibratory gyroscope and that is linked only to the application of the precession command.

It should therefore be noted that the second measurement advantageously makes it possible to correct the angular displacement value measured by the vibratory gyroscope undergoing calibration in the event that the support of the gyroscopic system has itself been subjected to a movement, in order to obtain an angular displacement value, linked only to the precession command, measured by the vibratory gyroscope to be calibrated.

Thus, the calibration according to an embodiment of the present invention can be carried out even when the gyroscopic system is on a mobile carrier. This advantageous characteristic is based on the fact that there are at least four vibratory gyroscopes in the gyroscopic system considered, and it is therefore possible to obtain a second measurement along the same axis as the first measurement provided by the gyroscope undergoing calibration.

A calibrated scale factor value can here be deduced from the angular displacement value between the first and second vibration positions as measured by the gyroscope, and corrected for any movement of the gyroscopic system, over the command value.

It is then possible to start by optionally correcting the first measurement of the angular displacement value between the first and second angular positions by means of the second measurement in order to subtract from it any movement of the carrier of the gyroscopic system. This angular displacement value corrected by the first measurement is then added to the duration of the period of time during which the command is applied, and this result is then divided by the number of volts represented by the command applied.

Provision can be made to express the scale factor in degrees per hour, per Volt for example.

When this vibratory gyroscope operates in rate mode, the measurement values that it provides are not impaired by angular noise, but they can have a scale factor quality level that is inadequate for the gyroscopic system in which this vibratory gyroscope is utilized. The implementation of such a method makes it possible to refine the calibration with respect to the scale factor value and therefore to obtain a vibratory gyroscope providing high-quality measurements.

In an embodiment of the present invention, the calibration method also comprises the following step, between step /1/ and step /2/:

/1-a/ applying, over a period of time, a second command capable of commanding a change in vibration position from the second vibration position to the first vibration position; and in step /2/, a calibrated scale factor value of the vibratory gyroscope to be calibrated is determined by calculating the average between, on the one hand, the value calculated in relation to step /1/ and, on the other hand, a value calculated in relation to step /1-a/ based on the period of time during which the second command is applied, the second command, an angular difference between the second and first vibration position measured according to the first measurement and an angular difference between the second and first vibration position measured according to the second measurement.

A calibrated scale factor value can moreover be impaired by a drift error of the gyroscope that affects the measurements carried out by the vibratory gyroscope to be calibrated. The drift error is always allocated the same sign when the vibration position rotates in one direction. As the command applied, or precession command, is applied in one case in one direction, then in another case in the opposite direction, the drift error is added to the precession command in one case and subtracted in the other case.

Due to these characteristics, we have two values calculated for the scale factor, obtained respectively by the application of the two commands in opposite directions. As a result, the first and second drift errors affecting the first and second calculated scale factor values, determined in the first and second vibration positions respectively, are of respective opposite signs. By calculating the average of the two calibrated scale factor values thus obtained, it is advantageously possible to cancel out the drift error that may impair each of the respective calculated scale factor values.

In an embodiment of the present invention, the calibration method also comprises the following steps, between step /1/ and step /2/:

/1-a/ applying, over a period of time, a second command capable of commanding a change in vibration position from the second vibration position to the first vibration position; and /1-b/ applying, over a period of time, a third command capable of commanding a change in vibration position from the first vibration position to a third vibration position; and in which, in step /2/, a calibrated scale factor value of the vibratory gyroscope to be calibrated is determined by calculating the average between, on the one hand, the value calculated in relation to step /1/ and, on the other hand, a value calculated in relation to step /1-b/ based on the period of time during which the third command is applied, the third command, an angular difference between the first and third vibration positions measured according to the first measurement and an angular difference between the first and third vibrations position measured according to the second measurement.

Advantageously here, it is possible to find the average between two calibrated scale factor values determined in vibration positions situated around the first vibration position, which can advantageously correspond to the usual operating point of the vibratory gyroscope.

Provision can be made for the second and third vibration positions to be situated 90 degrees on either side respectively of the first vibration position.

It can be considered that the error affecting the scale factor varies as a function of the vibration position essentially according to a second order harmonic. As a result, it is advantageous to have calibrated scale factor values for vibration positions separated by 180 degrees, as by calculating the average of these values, a more precise calibrated scale factor value is obtained.

It can be advantageous to determine a calibrated scale factor value of the vibratory gyroscope to be calibrated by also taking into account a value of the drift error of the gyroscope that can be calculated on completion of step 1-a.

In an embodiment of the present invention, the calibration method also comprises the following step:

reiterating K times steps /1/, /1-a/ and /1-b/, during each reiteration the second and third vibration positions being respectively different from the second and third vibration positions of the steps previously iterated, K being an integer;
in which a calibrated scale factor value is determined for each reiteration respectively, by calculating the average of the values calculated in relation to steps /1/ and /1-b/ of each iteration.

The error affecting the scale factor can be a function of the vibration position of the vibratory gyroscope. By proceeding in this way, it is possible to construct a model of the variation in the error affecting the scale factor as a function of the vibration position of the vibratory gyroscope. The calibration of the vibratory gyroscope is therefore more precise.

In order to be able to obtain reliable measurements, it is advantageously possible to provide that, during the implementation of the steps, the gyroscopic system provides gyroscopic measurements on the basis of measurement values provided by the second means of measurement.

Such a method according to an embodiment of the present invention makes it possible to easily correct the errors relating to the scale factor that affect the measurement values of a vibratory gyroscope in rate mode. In the event that the vibratory gyroscope is used in rate mode, these measurement values are not disturbed by the angular noise as explained above. As a result, it is possible to obtain a high level of quality and precision in the measurement values provided by such a vibratory gyroscope. It is possible to adjust the value of K as a function of the precision of the desired measurement values.

Here, it is advantageously possible to provide that during the implementation of these steps on one of the vibratory gyroscopes of the gyroscopic system considered, the measurement values provided by the latter and taken into account by the gyroscopic system in order to provide navigation information, are advantageously replaced by the measurement values provided by the second means of measurement.

In this context, it is therefore possible to temporarily disturb one of the vibratory gyroscopes, in order to have additional information about it so as to correct the measurement values that it provides in the first vibration position, whilst allowing the gyroscopic system to continue to operate reliably. As a result, it is therefore possible to carry out the steps of the method on one of the N vibratory gyroscopes, during a usual operation of the gyroscopic system.

Thus, even in the event that the error that is corrected here changes over time, it is possible to easily apply a relevant correction of this error by implementing regularly over time the steps of the method according to an embodiment of the present invention.

In the gyroscopic system considered here, the three gyroscopes can be orthogonal and a fourth can be situated along the trisectrix of the three orthogonal gyroscopes.

A second aspect of the present invention proposes a gyroscopic system capable of the implementation of a calibration method according to the first aspect of the present invention.

BRIEF DESCRIPTION OF THE DRAWINGS

Other characteristics and advantages of the invention will also become apparent on reading the following description. The latter is purely illustrative and must be read in light of the attached drawings, in which.

DETAILED DESCRIPTION OF THE DISCLOSURE

Hereafter, the present invention is described in its application to Type I gyroscopes. These Type I gyroscopes correspond to the axisymmetric gyroscopes of the Coriolis Vibratory Gyroscopes (CVG) type, such as for example of the Hemispherical Resonator Gyroscope (HRG) type, as described in the document 'Type I and Type II micromachined vibratory gyroscopes' by Andrei M. Shkel, pages 586-593, IEEE/ION (Institute of Electrical and Electronics Engineers/Institute Of Navigation' PLANS 2006, San Diego, Calif., USA).

These gyroscopes can operate in an open loop, i.e. in whole angle mode. They then make it possible to measure an absolute rotation angle on the basis of a measurement of an angle representing the vibration position of the gyroscope with respect to measurement electrodes.

Such a gyroscope can also be used in a closed loop by the control of the vibration position via an electrical command, the so-called precession command, as described in particular in document FR 2 755 227. In this case, the vibration position of the gyroscope is maintained in a fixed position, and the measurement is deduced from the command that it is necessary to apply to the gyroscope in order to maintain it in this fixed vibration position. This type of operation is also called "rate" mode. The values provided by the physical measurement then correspond to a speed of rotation.

Figure 1:
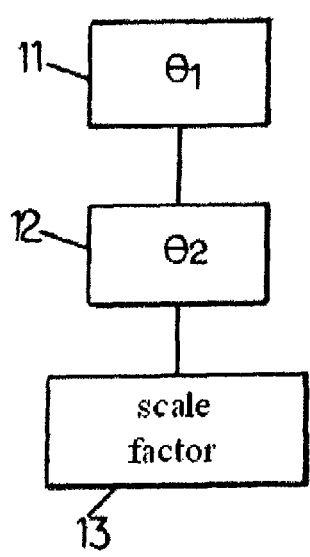
FIG. 1 illustrates the main steps of a calibration method in a gyroscopic system according to an embodiment of the present invention.

FIG. 1 illustrates the main steps of a calibration method in a gyroscopic system according to an embodiment of the present invention.

The gyroscopic system in which the calibration method is utilized comprises at least four vibratory gyroscopes that are arranged so that the measurement axis of one of these vibratory gyroscopes is the same as a measurement axis of a combination of the measurements provided by the other vibratory gyroscopes of the system. The measurement values that they provide can be impaired by an error in relation to a scale factor in low-quality rate mode. An embodiment of the present invention aims to correct this type of error in a gyroscopic system as described above.

The vibratory gyroscope to be calibrated for which provision is made to apply steps /1/ to /2/ is hereafter referred to by the terms 'first means of measurement' providing a first measurement and the set of the other vibratory gyroscopes is referred to by the term 'second means of measurement' providing a second measurement. In the gyroscopic system considered here, it is possible to envisage that, in a usual operating mode, the navigation information provided by the gyroscopic system is obtained from the measurement values provided by the at least three other vibratory gyroscopes of the system. In this case, preferably, the vibratory gyroscope of the first means of measurement, i.e. the gyroscope undergoing calibration, does not provide measurement values that are taken into consideration by the system in usual operating mode.

In a gyroscopic system according to an embodiment of the present invention comprising a number N of vibratory gyroscopes, N being an integer greater than or equal to 4, provision can be made to calibrate each of these gyroscopes in turn, according to a calibration method of the present invention.

When steps /1/ and /2/ have been applied to all the vibratory gyroscopes that it is envisaged to use in a usual operating mode of the gyroscopic system, the system is then able to provide effective navigation information on the basis of these gyroscopes, since the measurement values respectively provided by them are then corrected according to an embodiment of the present invention. One of the gyroscopes can be an additional vibratory gyroscope that is not used in the usual operating mode of the system. It makes it possible to provide, in combination with other gyroscopes of the system, a second measurement along the same axis as the vibratory gyroscope undergoing calibration, capable of replacing the vibratory gyroscope within the system, while the precession command steps are applied to it.

A vibratory gyroscope used in a usual operating mode of the system is intended to be maintained in a first vibration position for operation in rate mode, for example.

In order to improve the performance of the gyroscopic system according to an embodiment of the present invention, it is proposed to correct a scale factor error that affects the measurement values provided in a first vibration position of the vibratory gyroscope.

In a step 11, this vibratory gyroscope vibrates in its usual vibration position $\theta_1$ which is this first vibration position.

In a step 12, a change in vibration position from the first vibration position to a second vibration position $\theta_2$ is then commanded.

We then have the following information in the context of the gyroscopic system described:
the command applied, for example expressed in volts;
the period of time during which this command is applied;
an angular difference between the first and second vibration positions according to the first measurement; and
an angular difference according to the second measurement.

It can be noted that this angular difference is measured during the period of change in vibration position of the gyroscope to be calibrated.

Based on these data, in a step 13, it is possible to calculate a calibrated scale factor value of the gyroscope undergoing calibration, even if the carrier of the gyroscopic system has been moving. Using the measurement from the second means of measurement, it is possible to correct the first measurement for any movements of the carrier in order to ultimately recover only the angular displacement between the first and second vibration positions due exclusively to the precession command applied.

For example, C denotes the command in volts applied as a precession command to the vibratory gyroscope, assumed here to be of constant value to facilitate the presentation of the example. SF0 denotes the value of the nominal scale factor of the vibratory gyroscope to be calibrated expressed in °/hour/volt making it possible to express a desired precession speed in volts. Then, T denotes the period of time during which the precession command C is applied. In this context, it is possible to determine the precession command C to be applied to the vibratory gyroscope to be calibrated according to the following equation, when $\theta_2-\theta_1$ corresponds to the desired angular difference:

$$C=(\theta_2-\theta_1)_{desired}/T \times SF0$$

The new value SF1 of the scale factor obtained on completion of the present calibration phase then verifies the following equation:

$$SF1=(\theta_2-\theta_1)_{measured}/(T \times C)$$

where $(\theta_2-\theta_1)_{measured}$ corresponds to the angular difference, or angular displacement, between the first and second vibration positions obtained on the basis of the first measurement, corrected as a function of the second measurement, in order optionally to remove an angular difference linked to the movement of the carrier.

In an embodiment of the present invention, a change in vibration position is also commanded from the second vibration position back to the first vibration position. Two separate values are then available, calculated in relation to the two precession command steps, the first command making it possible to pass from the first to the second vibration position and the second command making it possible to pass from the second vibration position to the first vibration position. It is then possible to find the average of these two calculated values. By proceeding in this way, the first and second drift errors which can affect the first and second calculated values of the scale factor, are then cancelled out.

Figure 2:
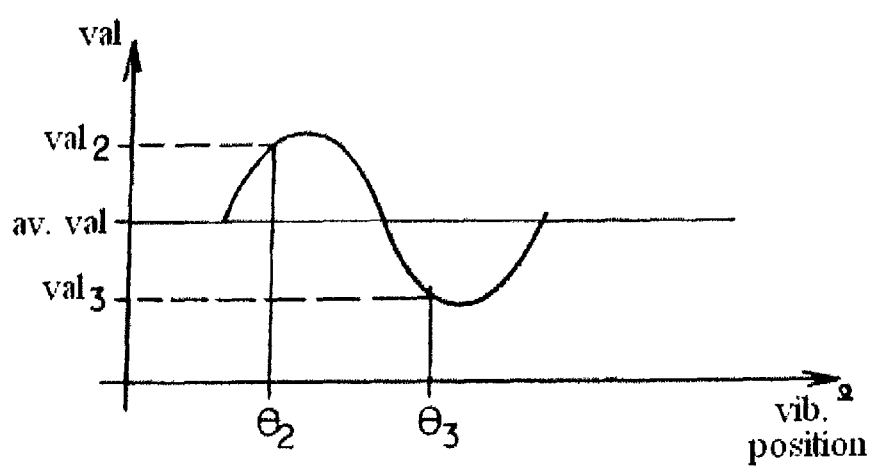
FIG. 2 illustrates changes in the error values affecting the scale factor of a vibratory gyroscope.

FIG. 2 illustrates variations in the value of the sinusoidal error that affects a measurement from a vibratory gyroscope operating in rate mode. The substantially sinusoidal curve is represented in a location representing the vibration position along the x-axis and the measurement value fluctuating as a function of the error considered here along the y-axis.

It should be noted that the value of the error that is taken into consideration in this case has an average value of zero around the whole circle of the vibration positions.

It can be envisaged that after commanding the return to the first vibration position $\theta_1$, a subsequent step is commanded in order to rotate the vibration position to a third position $\theta_3$, in order to provide a third measurement value $val_3$. This third vibration position is situated substantially symmetrically with respect to the second position on the other side of the first vibration position.

Thus, it is possible to have two calculated scale factor values, a first calculated value that relates to the precession command applied in order to pass from the first vibration position to the second vibration position and a second calculated value that relates to the precession command applied in order to pass from the first vibration position to the third vibration position, at the level of the vibratory gyroscope to be calibrated.

Provision is made here to find the average of these two calculated values, in relation to vibration positions situated substantially symmetrically on either side of the first vibration position, which can be the vibration position in which the vibratory gyroscope is maintained in order to provide its measurement values within the gyroscopic system considered.

Whatever the first vibration position considered, by proceeding in this way, it is possible to determine a relevant calibrated scale factor value in order to calibrate this vibratory gyroscope in the first vibration position.

In the event that an increase in the precision of the calibrated scale factor value is sought, provision can be made to reiterate the command steps in order to rotate the vibration position, on one side then on the other symmetrically with respect to the first vibration position, reaching, with each new iteration, second and third vibration positions that are different from those that have been applied in the previous iterations.

Each iteration has a corresponding calibrated scale factor value obtained by calculating the average of the two values calculated for the two vibration positions, which are symmetrical with respect to the first vibration position, corresponding to this iteration. This iteration makes it possible to refine the determination of the calibrated scale factor values.

Here, the different calibrated scale factor values obtained on each iteration can be added up in order to find their average, by dividing the result of the addition by the number of iterations of these steps.

Figure 3:
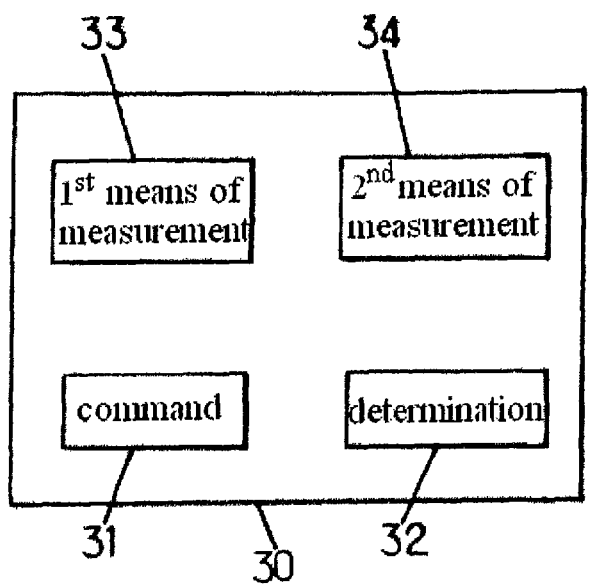
FIG. 3 illustrates a gyroscopic system according to an embodiment of the present invention.

FIG. 3 illustrates a gyroscopic system according to an embodiment of the present invention.

This gyroscopic system comprises a first means of measurement 33, i.e. the vibratory gyroscope to be calibrated, and a second means of measurement 34, i.e. the set N−1 of other vibratory gyroscopes. It also comprises:
  a command unit 31 for applying, over a period of time, an initial command for a change in vibration position from a first vibration position to a second vibration position; and
  a determination unit 32 capable of determining a calibrated scale factor value of the vibratory gyroscope to be calibrated on the basis of a value calculated in relation to the initial command based on the period of time during which the command is applied, the command, an angular difference between the first and second vibration positions measured according to the first measurement and an angular difference measured according to the second measurement.

It can be noted that this last angular difference is measured during the period of change in vibration position of the gyroscope to be calibrated. The command unit 31 can moreover be capable of applying, over a period of time, a second command capable of commanding a change in vibration position from the second vibration position to the first vibration position; and the determination unit 32 can then moreover be capable of determining a calibrated scale factor value by calculating the average between, on the one hand, the value calculated in relation to the command applied and, on the other hand, a value calculated in relation to the second command based on the period of time during which the second command is applied, the second command, an angular difference between the second and first vibration positions measured according to the first measurement and an angular difference between the second and first vibration positions measured according to the second measurement.

In an embodiment of the present invention, the command unit 31 is capable of applying, over a period of time, a second command capable of commanding a change in vibration position from the second vibration position to the first vibration position; and of applying, over a period of time, a third command capable of commanding a change in vibration position from the first vibration position to a third vibration position; and the determination unit 32 is moreover capable of determining a calibrated scale factor value by calculating the average between, on the one hand, the value calculated in relation to the initial command and, on the other hand, a value calculated in relation to the third command based on the period of time during which the third command is applied, the third command, an angular difference between the first and third vibration positions measured according to the first measurement and an angular difference between the first and third vibration positions measured according to the second measurement.

The second and third vibration positions can be situated 90 degrees on either side of the first vibration position respectively.

The invention claimed is:

1. A method of calibrating a gyroscope to be calibrated in a gyroscopic system comprising at least four vibratory gyroscopes capable of changing vibration position among a plurality of vibration positions;
  a first measurement being provided by said vibratory gyroscope to be calibrated, and a second measurement being provided by a combination of the respective measurements from the other vibratory gyroscopes of the system, said first and second measurements being carried out along a same measurement axis;
  said calibration method comprising the following steps at the level of the vibratory gyroscope to be calibrated:
  /1/ applying, to the gyroscope to be calibrated, over a period of time, an initial command for a change in vibration position from a first vibration position ($\theta_1$) to a second vibration position ($\theta_2$); and
  /2/ determining a calibrated scale factor value of the vibratory gyroscope to be calibrated, on the basis of a value calculated in relation to step /1/, based on the period of time during which the initial command is applied, the initial command, an angular difference between the first and second vibration positions measured according to the first measurement and an angular difference between the first and second vibration positions measured according to the second measurement.

2. The calibration method according to claim 1, also comprising the following step, between step /1/ and step /2/:
  /1-a/ applying, over a period of time, a second command capable of commanding a change in vibration position from the second vibration position to the first vibration position; and
  in which, in step /2/, a calibrated scale factor value of the vibratory gyroscope to be calibrated is determined by calculating the average between, on the one hand, the value calculated in relation to step /1/ and, on the other hand, a value calculated in relation to step /1-a/ based on the period of time during which the second command is applied, the second command, an angular difference between the second and first vibration positions measured according to the first measurement and an angular difference between the second and first vibration positions measured according to the second measurement.

3. The calibration method according to claim 1, also comprising the following steps, between step /1/ and step /2/:
  /1-a/ applying, over a period of time, a second command capable of commanding a change in vibration position from the second vibration position to the first vibration position; and
  /1-b/ applying, over a period of time, a third command capable of commanding a change in vibration position from the first vibration position to a third vibration position; and in which, in step /2/, a calibrated scale factor value of the vibratory gyroscope to be calibrated is determined by calculating the average between, on the one hand, the value calculated in relation to step /1/ and, on the other hand, a value calculated in relation to step /1-b/ based on the period of time during which the third command is applied, the third command, an angular difference between the first and third vibration positions measured according to the first measurement and an angular difference between the first and third vibration positions measured according to the second measurement.

4. A method of calibrating a gyroscopic system according to claim 3, in which the second and third vibration positions are situated 90 degrees on either side of the first vibration position respectively.

5. A method of calibrating a gyroscopic system according to claim 3, also comprising the following step:
reiterating K times steps /1/, /1-a/ and /1-b/, during each reiteration the second and third vibration positions being respectively different from the second and third vibration positions of the steps previously iterated, K being an integer;
in which a calibrated scale factor value is determined for each reiteration respectively, by calculating the average of the values calculated in relation to steps /1/ and /1-b/ of each iteration.

6. A method of calibrating a gyroscopic system according to claim 1, in which, during the implementation of the steps, the gyroscopic system provides gyroscopic measurements on the basis of measurement values provided by the second means of measurement.

7. The gyroscopic system comprising at least four vibratory gyroscopes capable of changing vibration position among a plurality of vibration positions;
a first measurement being provided by a vibratory gyroscope to be calibrated, among the at least four vibratory gyroscopes of the gyroscopic system, and a second measurement being provided by a combination of the respective measurements from the other vibratory gyroscopes of the system, said first and second measurements being carried out along a same measurement axis;
said gyroscopic system comprising:
a command unit for applying, over a period of time, an initial command for a change in vibration position from a first vibration position ($\theta_1$) to a second vibration position ($\theta_2$); and
a determination unit capable of determining a calibrated scale factor value of the vibratory gyroscope to be calibrated on the basis of a value calculated in relation to the initial command based on the period of time during which the command is applied, the command, an angular difference between the first and second vibration positions measured according to the first measurement and an angular difference between the first and second vibration positions measured according to the second measurement.

8. The gyroscopic system according to claim 7, in which the command unit is moreover capable of applying, over a period of time, a second command capable of commanding a change in vibration position from the second vibration position to the first vibration position; and
in which the determination unit is moreover capable of determining a calibrated scale factor value by calculating the average between, on the one hand, the value calculated in relation to the initial command and, on the other hand, a value calculated in relation to the second command based on the period of time during which the second command is applied, the second command, an angular difference between the second and first vibration positions measured according to the first measurement and an angular difference between the second and first vibration positions measured according to the second measurement.

9. The gyroscopic system according to claim 7, in which the command unit is capable of applying, over a period of time, a second command capable of commanding a change in vibration position from the second vibration position to the first vibration position; and of applying, over a period of time, a third command capable of commanding a change in vibration position from the first vibration position to a third vibration position; and
in which the determination unit is moreover capable of determining a calibrated scale factor value by calculating the average between, on the one hand, the value calculated in relation to the initial command and, on the other hand, a value calculated in relation to the third command based on the period of time during which the third command is applied, the third command, an angular difference between the first and third vibration positions measured according to the first measurement and an angular difference between the first and third vibration positions measured according to the second measurement.

10. The gyroscopic system according to claim 7, in which the second and third vibration positions are situated 90 degrees on either side of the first vibration position respectively.

* * * * *